United States Patent
Yeon et al.

(10) Patent No.: US 8,208,567 B2
(45) Date of Patent: Jun. 26, 2012

(54) APPARATUS AND METHOD FOR REDUCING PAPR IN AN OFDM SYSTEM

(75) Inventors: Hae-Dong Yeon, Hwaseong-si (KR); In-Hyoung Kim, Yongin-si (KR); Jin-Woo Roh, Suwon-si (KR); Sung-Soo Kim, Seoul (KR); Bong-Gee Song, Seongnam-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 750 days.

(21) Appl. No.: 12/253,174

(22) Filed: Oct. 16, 2008

(65) Prior Publication Data

US 2009/0097579 A1 Apr. 16, 2009

(30) Foreign Application Priority Data

Oct. 16, 2007 (KR) .................. 10-2007-0103890

(51) Int. Cl.
*H04K 1/10* (2006.01)
*H04L 27/28* (2006.01)
(52) U.S. Cl. .................. 375/260; 375/303; 455/59
(58) Field of Classification Search .......... 375/303, 375/260; 455/59
See application file for complete search history.

(56) References Cited

U.S. PATENT DOCUMENTS

| 7,339,955 B2 * | 3/2008 | Lakkis ............... 370/498 |
| 2005/0265479 A1 * | 12/2005 | Fujii et al. ............ 375/303 |

FOREIGN PATENT DOCUMENTS

| KR | 10-2001-0069611 A | 7/2001 |
| KR | 10-2007-0018504 A | 2/2007 |
| KR | 10-2007-0033142 A | 3/2007 |
| KR | 10-0717972 B1 | 5/2007 |

* cited by examiner

*Primary Examiner* — Kevin M Burd
*Assistant Examiner* — Tanmay Shah
(74) *Attorney, Agent, or Firm* — Jefferson IP Law, LLP

(57) ABSTRACT

An apparatus and method for reducing a Peak-to-Average Power Ratio (PAPR) are provided. The apparatus includes a gain processor for multiplying time signals in paths by gains set for respective paths, a delay processor for delaying gain-multiplied signals in second to last paths except for a first path by time delays set for respective second to last paths, a summer for summing the gain-multiplied signal for the first path received from the gain processor and the delayed signals received from the delay processor, a PAPR processor for measuring a PAPR of the summed signal received from the summer, for comparing the measured PAPR with a target PAPR, and for requesting one or more changes of at least one of the gain and time delay of each path, and a gain delay controller for changing the at least one of the gain and the time delay of each path according to the request received from the PAPR processor and for controlling the gain processor and the delay processor according to the change.

18 Claims, 5 Drawing Sheets

APPARATUS AND METHOD FOR REDUCING PAPR IN AN OFDM SYSTEM

PRIORITY

This application claims the benefit under 35 U.S.C. §119(a) of a Korean patent application filed in the Korean Intellectual Property Office on Oct. 16, 2007 and assigned Ser. No. 2007-103890, the entire disclosure of which is hereby incorporated by reference.

BACKGROUND OF THE INVENTION

1. Field of the Invention

The present invention relates to an apparatus and method for reducing Peak-to-Average Power Ratio (PAPR) in an Orthogonal Frequency Division Multiplexing (OFDM) system. More particularly, the present invention relates to a linear PAPR reduction apparatus and method for reducing a decrease in throughput and frequency efficiency during PAPR reduction and achieving a low hardware complexity relative to a conventional linear PAPR reduction apparatus.

2. Description of the Related Art

OFDM is a widely used and often discussed technology along with Code Division Multiple Access (CDMA). Because a high-rate serial signal is converted to a plurality of parallel signals and transmitted on a plurality of subcarriers, OFDM is capable of a high data rate, a high frequency efficiency, and robustness against frequency fading channels. However, OFDM has shortcomings in terms of Carrier Frequency Offset (CFO) or PAPR. To keep a channel from impairing orthogonality between subcarriers, OFDM inserts a Cyclic Prefix (CP) in a transmission signal.

In OFDM, a signal is subject to Inverse Fast Fourier Transform (IFFT) prior to transmission on a plurality of subcarriers. A signal resulting from adding a plurality of sine waves to the transmission signal by IFFT has a high PAPR. That is, the PAPR of an OFDM signal is higher than that of a CDMA signal or a signal of any other wired/wireless communication technology, thereby causing non-linear distortion at a High Power Amplifier (HPA) of a transmitter or decreasing the power efficiency of the HPA.

At present, techniques for PAPR reduction in OFDM are under active study. These techniques are categorized into non-linear ones and linear ones. The non-linear PAPR techniques include clipping, clipping & filtering, peak windowing, and peak cancellation, and the linear PAPR techniques include SeLective Mapping (SLM), Partial Transmit Sequence (PTS), and tone reservation.

A non-linear PAPR reduction technique of interest is clipping. In the clipping scheme, when the amplitude of a $k^{th}$ sample $s_k$ of an IFFT time signal is larger than a PAPR threshold A, the amplitude of the sample $s_k$ is reduced to A in a forced manner, without changing the phase of the sample $s_k$. If the amplitude of the sample $s_k$ is less than A, the sample $s_k$ is simply output. Despite the advantages of easy implementation and very low hardware complexity, the clipping causes as much non-linear distortion as the difference between the amplitude of the sample $s_k$ and A. The non-linear distortion leads to in-band Error Vector Magnitude (EVM) performance degradation and increases adjacent channel out-band emission. As a consequence, spectrum performance is degraded.

$$s_k = |s_k|\exp(j\phi_k) \quad (1)$$
$$\Rightarrow \hat{s}_k = \begin{cases} s, & \text{if } |s_k| \leq A \\ A\exp(j\phi_k), & \text{if } |s_k| > A \end{cases}$$

where $s_k$ is the $k^{th}$ sample of the IFFT time signal, A is the PAPR threshold, $\hat{s}_k$ is the clipped signal of $s_k$, and $\phi_k$ is the phase of the $k^{th}$ sample $s_k$.

Although clipping & filtering, peak-windowing, and peak-cancellation have been proposed to overcome the drawbacks of clipping, there still exists non-linear distortion inherent to non-linear PAPR reduction.

A linear PAPR reduction technique of interest is SLM, which will now be described with reference to FIG. 1.

FIG. 1 is a block diagram of a conventional SLM-based PAPR reduction apparatus. Referring to FIG. 1, in SLM, a Parallel-to-Serial (P/S) converter 102 divides an input frequency signal into K paths and multipliers 104 and 106 produce independent signals by multiplying signals in independent paths by different phase shift vectors $b_k$. IFFT processors 108, 110 and 112 IFFT-process the independent signals and a PAPR selector 114 selects an IFFT signal in a path with the lowest PAPR from among the IFFT signals.

As illustrated in FIG. 1, the SLM-based PAPR reduction apparatus requires a total of U IFFT processors 108, 110 and 112, thus increasing hardware complexity. In addition, without knowledge of the path of a signal in a current symbol among the K paths, a receiver cannot demodulate the signal. Hence, side information should be additionally transmitted to the receiver. Thus, SLM decreases the overall throughput of a transmission/reception system.

As described above, in spite of relatively low hardware complexity and simple implementation, the non-linear PAPR reduction techniques suffer from EVM- and out-band emission-incurred performance degradation due to non-linear distortion during PAPR reduction in the transmitter. The linear PAPR reduction techniques, SLM and PTS should transmit information about a phase rotation sequence used for PAPR reduction in every symbol to the receiver, thereby decreasing the throughput of the transmission/reception system. Similarly, tone reservation decreases frequency efficiency because as wide a bandwidth as a reserved tone inserted for PAPR reduction is dissipated. In addition, these linear PAPR reduction techniques have high hardware complexity and are complex to implement.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing PAPR in an OFDM system.

Another aspect of the present invention is to provide a PAPR reduction apparatus and method for outputting data with a lower PAPR than a target PAPR by multiplying signals in multiple paths of a channel by as many gains as there are multiple paths and delaying the multiplied signals in a transmitter of an OFDM system.

A further aspect of the present invention is to provide an apparatus and method for PAPR reduction by measuring the PAPR of signals in multiple paths of a channel after multiplying the signals in the multiple paths by as many gains as there are multiple paths and delaying the multiplied signals and repeating the measurement as many times as can be, while changing the gains and the time delays until a lower PAPR than a target PAPR is achieved in a transmitter of an OFDM system.

In accordance with an aspect of the present invention, an apparatus for reducing PAPR is provided. The apparatus includes a gain processor for multiplying time signals in paths by gains set for respective paths, a delay processor for delaying gain-multiplied signals in second to last paths except for a first path by time delays set for respective second to last paths, a summer for summing the gain-multiplied signal for the first path received from the gain processor and the delayed signals received from the delay processor, a PAPR processor for measuring a PAPR of the summed signal received from the summer, for comparing the measured PAPR with a target PAPR, and for requesting one or more changes of at least one of the gain and the time delay of each path, and a gain delay controller for changing the at least one of the gain and the time delay of each path according to the request received from the PAPR processor and for controlling at least one of the gain processor and the delay processor according to the respective change.

In accordance with another aspect of the present invention, a method for reducing PAPR is provided. The method includes multiplying signals in paths by gains set for respective paths, delaying gain-multiplied signals in second to last paths except for a first path by time delays set for respective second to last paths, summing the gain-multiplied signal for the first path and the delayed signals, measuring a PAPR of the sum signal, comparing the measured PAPR with a target PAPR, and changing at least one of the gain and the time delay of each path according to the comparison.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary $s_k$ ill in the art will recognize that various changes and modifications of the embodiments described herein can be made without departing from the scope and spirit of the invention. In addition, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention are intended to provide an apparatus and method for PAPR reduction by measuring the PAPR of signals in multiple paths of a channel after multiplying the signals of the multiple paths by as many gains as there are multiple paths and delaying the multiplied signals and repeating the measurement, while changing the gains and the time delays until a lower PAPR than a target PAPR is achieved in an OFDM system.

Figure 1:
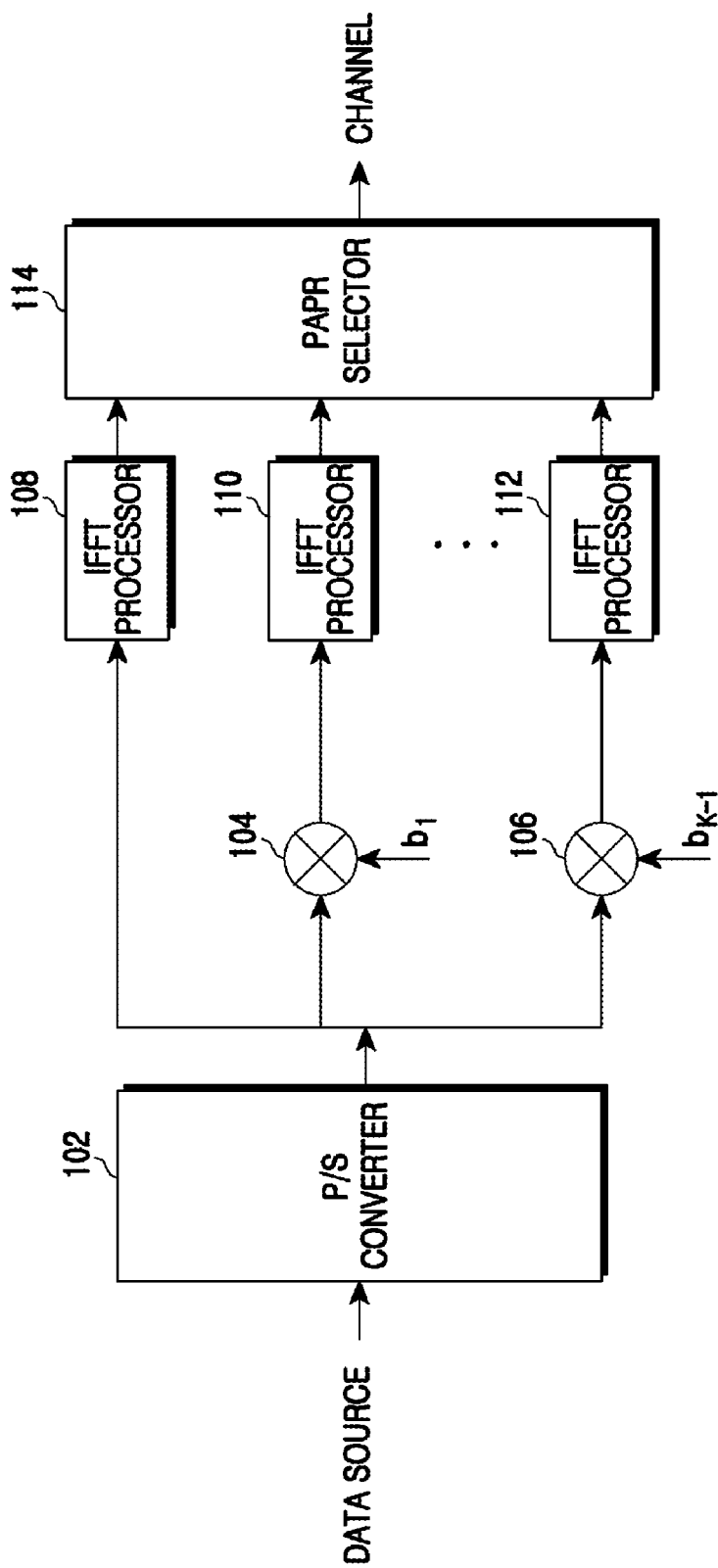
FIG. 1 is a block diagram of a conventional SLM-based PAPR reduction apparatus.
Figure 2:
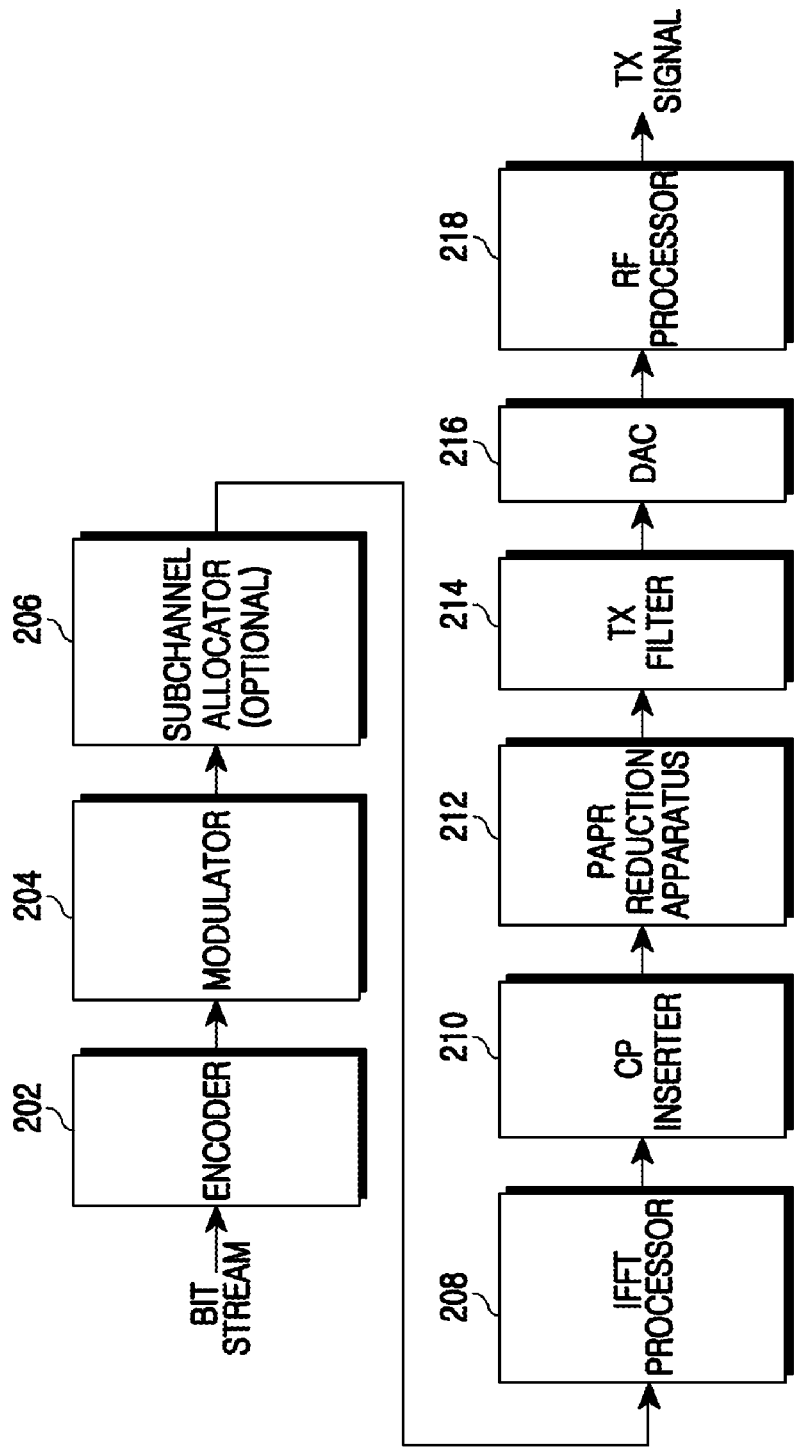
FIG. 2 is a block diagram of a transmitter in an Orthogonal Frequency Division Multiplexing/Orthogonal Frequency Division Multiple Access (OFDM/OFDMA) system according to an exemplary embodiment of the present invention.

FIG. 2 is a block diagram of a transmitter in an OFDM/OFDMA system according to an exemplary embodiment of the present invention.

Referring to FIG. 2, the transmitter may include an encoder 202, a modulator 204, a subchannel allocator 206, an IFFT processor 208, a CP inserter 210, a PAPR reduction apparatus 212, a Transmission (Tx) filter 214, a Digital-to-Analog Converter (DAC) 216, and a Radio Frequency (RF) processor 218. The PAPR reduction apparatus 212 can be displaced in a time domain.

The encoder 202 may channel-encode input data at a defined coding rate to make the input data robust against a radio channel. The modulator 204 may modulate the channel-coded data in a defined modulation scheme such as Quadrature Phase Shift Keying (QPSK), 16-ary Quadrature Amplitude Modulation (16QAM), or 64-ary QAM (64QAM).

The subchannel allocator 206 may allocate the modulated signal to an allocated frequency area. The subchannel allocator 206 may be used in an OFDMA system. In an OFDM system, the modulated signal may be output to the IFFT processor 208 after serial-to-parallel conversion without the need of using the subchannel allocator 206.

The IFFT processor 208 may convert the received frequency signal into a time signal by IFFT. The CP inserter 210 may insert a CP into the IFFT signal to eliminate Inter-Symbol Interference (ISI) caused by multipath fading of a radio channel.

The PAPR reduction apparatus 212 may reduce the PAPR of the CP-inserted time signal according to a PAPR reduction technique of exemplary embodiments of the present invention. The PAPR reduction apparatus 212 will be described later in detail with reference to FIG. 3.

The Tx filter 214 may oversample the PAPR-reduced time signal and the DAC 216 may convert the digital signal received from the Tx filter 214 into an analog signal. The RF processor 218 may upconvert the baseband signal received from the DAC 216 into an RF signal transmittable through the air.

Figure 3:
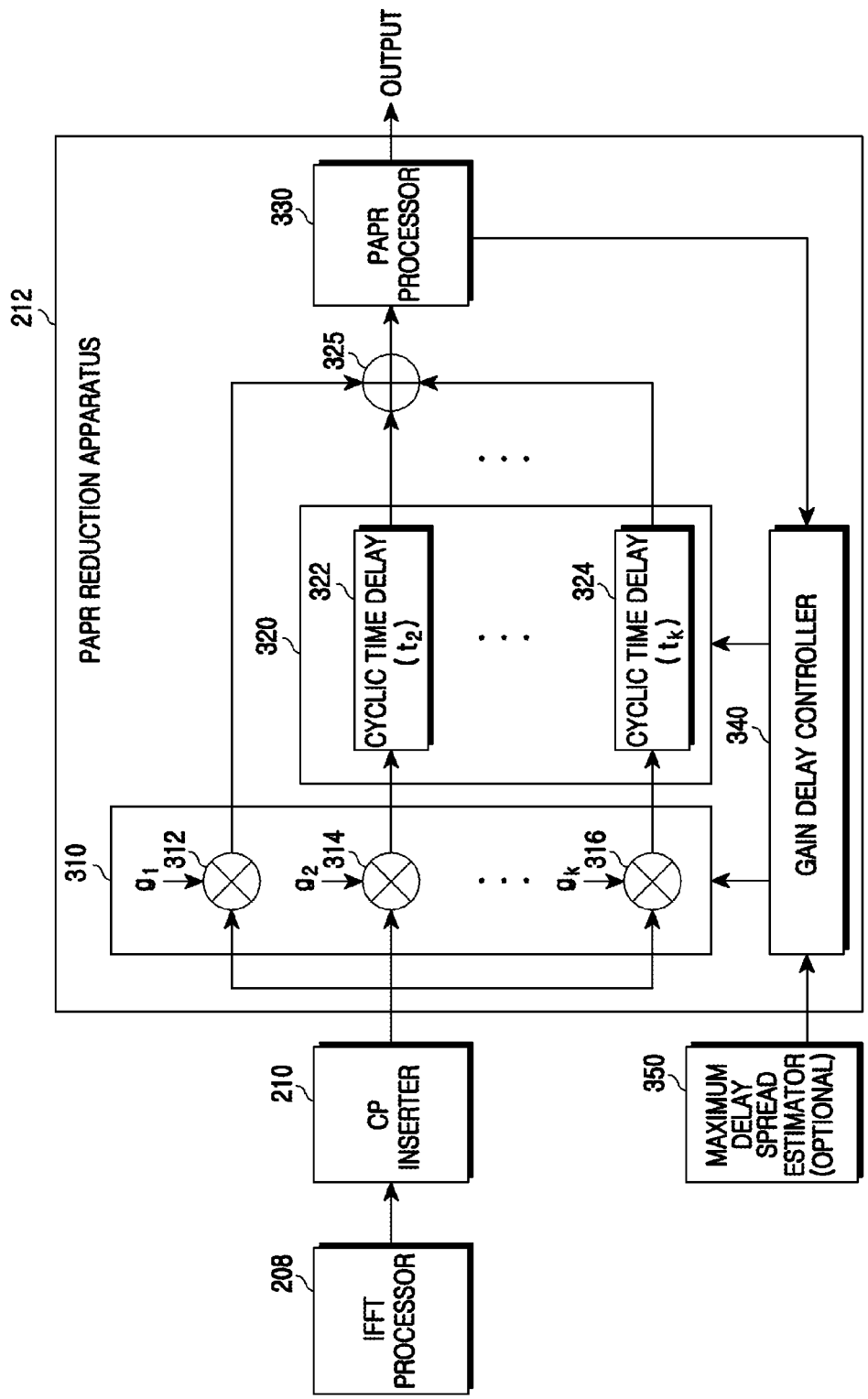
FIG. 3 is a detailed block diagram of a PAPR reduction apparatus in a transmitter of an OFDM/OFDMA system according to an exemplary embodiment of the present invention.

FIG. 3 is a detailed block diagram of a PAPR reduction apparatus in a transmitter of an OFDM/OFDMA system according to an exemplary embodiment of the present invention. Referring to FIG. 3, the PAPR reduction apparatus 212 may include a gain processor 310, a delay processor 320, a summer 325, a PAPR processor 330, and a gain delay controller 340.

The gain processor 310 may include multipliers 312, 314 and 316 for respective paths, for multiplying signals in the paths by gains corresponding to the respective paths under the control of the gain delay controller 340. The delay processor 320 may have cyclic time delays 322 and 324 for the paths except a first path, for delaying the gain-multiplied signals in the paths except the first path by times corresponding to the paths except the first path under the control of the gain delay controller 340.

Figure 4:
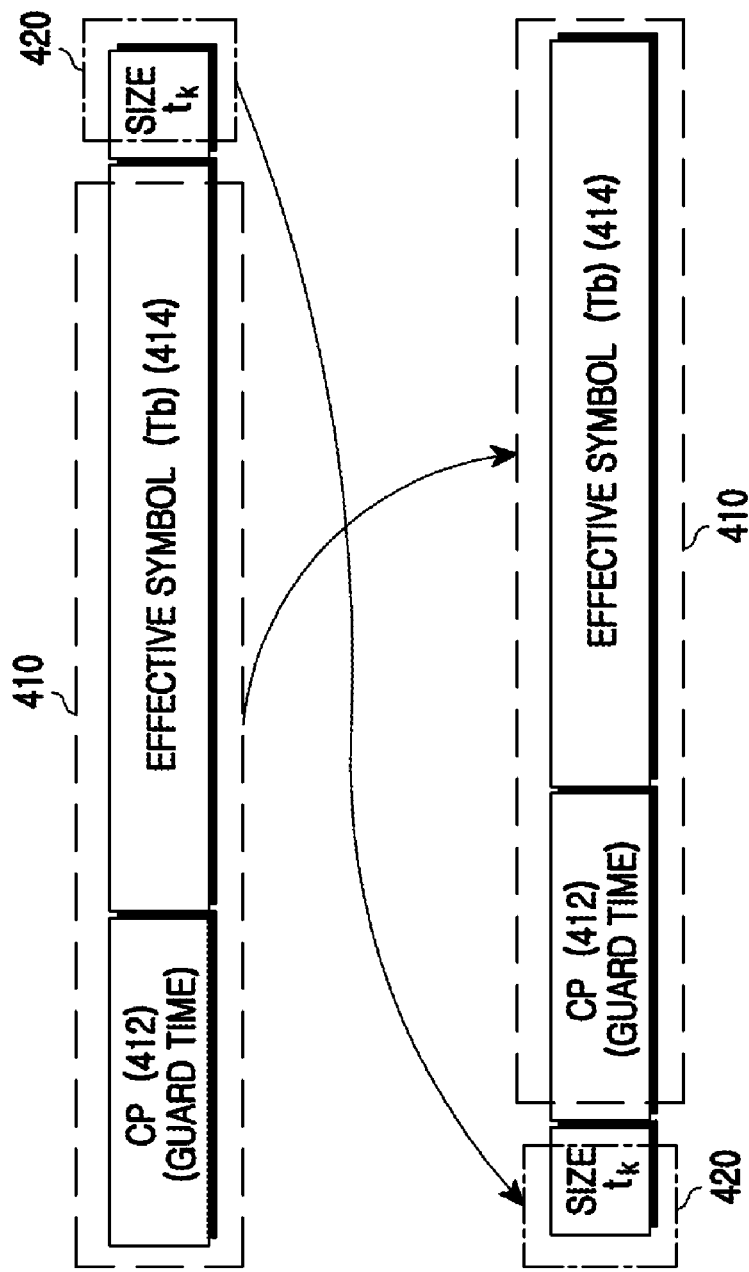
FIG. 4 illustrates a structure of a cyclically time-delayed frame in a PAPR reduction apparatus according to an exemplary embodiment of the present invention.

With reference to FIG. 4, an operation of the cyclic time delays 322 and 324 will be described. FIG. 4 illustrates a structure of a cyclically time-delayed frame in a PAPR reduction apparatus according to an exemplary embodiment of the present invention. Referring to FIG. 4, the cyclic time delays 322 and 324 may cyclically shift the frame including a first part 410 comprising a CP 412 and an effective symbol 414, and a second part 420, by as much as a time delay $t_k$ for a $k^{th}$ path by the time delay $t_k$ so that the second part 420 is positioned before the CP 412 of the first part 410. The IFFT output may be a periodic function and the CP may be cyclically shifted not to lose signal continuity. Therefore, the time-delayed signal may retain substantially the same characteristics. In a real world implementation, the cyclic time delays 322 and 324 can be configured such that they start to read data at different positions for the multiple paths and return to the start of the data at the end of the data.

Returning to FIG. 3, the summer 325 may sum the signals from the multiple paths, that is, the signal received from the gain processor 310 for the first path and the signals received from the delay processor 320 for the paths except for the first path. The PAPR processor 330 may measure the PAPR of the signal received from the summer 325 and, if the PAPR is equal to or less than a target PAPR, may output the received signal. If the PAPR is larger than the target PAPR, the PAPR processor 330 may request the gain delay controller 340 to change parameters of the multiple paths, i.e. gains and time delays for the multiple paths.

Each time the PAPR processor 330 measures a PAPR, it may compare a buffered smallest PAPR with the measured PAPR, may update the smallest PAPR, and may buffer a signal with the updated smallest PAPR. If there is no PAPR equal to or less than the target PAPR in spite of all possible changes in gains and time delays, the PAPR processor 330 may output a signal with the buffered smallest PAPR.

Upon receipt of the parameter change request from the PAPR processor 330, the gain delay controller 340 may control the gains of K paths, $g_1$ to $g_K$ and the time delays of a second to $K^{th}$ paths, $t_2$ to $t_K$.

More specifically, given K paths, the parameters of the $K^{th}$ path may be changed first. When the parameters of the $K^{th}$ path cannot be changed any more, the parameters of the $(K-1)^{th}$ path may be changed. This process may be repeated until the parameters of the second path are all changed. That is, when continuously receiving the parameter change request from the PAPR processor 330 due to the absence of a signal with a PAPR less than the target PAPR, the gain delay controller 340 may produce all possible cases by changing the parameters of the $K^{th}$ to second paths.

Parameters subject to change are a time delay and a gain. Each time a parameter change request is received, the time delay may be increased by a defined delay unit, eventually reaching a defined maximum time delay. The maximum time delay can be preset or set by calculation.

The gain applied to the $k^{th}$ path, $g_k$, may be given as equation (2). As noted from equation (2), $g_k$ may be a complex value. When its phase value $\phi_k$ is 0 or 180 degrees, $g_k$ may be a real value. The sum of the gains of all paths $g_1$ to $g_K$ should be 1.

$$g_k = |g_k| \exp(j\phi_k),$$

$$g_1^2 + g_2^2 + \ldots g_K^2 = 1 \tag{2}$$

where $g_k$ denotes the gain of the $k^{th}$ path and $\phi_k$ denotes the phase component of the $k^{th}$ path.

The gain control using equation (2) is done by rotating the phase of each gain. While the phase rotation of $\phi_k$ of equation (2) is complex in real world hardware implementations, if $\phi_k$ is 0, 90, 180 or 270 degrees, the phase rotation may be more simple as it would have require less extensive computations. For example, a phase rotation of 90 degrees may be equivalent to exchanging a real part with an imaginary part and then changing the sign of the real part, as expressed in equation (3). Thus, the phase rotation can be performed easily. Similarly, a phase rotation of 270 degrees may be done by changing the signs of the real part and the imaginary part in the case of the 90-degree phase rotation. For a phase rotation of 180 degrees, only the sign of an input signal may need to be changed.

$$s_k = a_k + j \cdot b_k : k\text{th input signal}$$

$$s_k \times \exp(j\phi_k) = (a_k + j \cdot b_k) \times j = -b_k + j \cdot a_k : \phi_k = 90°$$

$$s_k \times \exp(j\phi_k) = (a_k + j \cdot b_k) \times -1 = -a_k - j \cdot b_k : \phi_k = 180°$$

$$s_k \times \exp(j\phi_k) = (a_k + j \cdot b_k) \times -j = b_k - j \cdot a_k : \phi_k = 270° \tag{3}$$

where $s_k$ denotes the $k^{th}$ sample, $a_k$ denotes the real value of the $k^{th}$ sample, $b_k$ denotes the imaginary value of the $k^{th}$ sample, and $\phi_k$ denotes the phase component of the $k^{th}$ sample.

As described above, the gain delay controller 340 may control the gains by rotating the phases of the gains. The phase of the $k^{th}$ path can be expressed as $$\phi_k = \frac{0}{\text{MaxPhaseSize}} \times 2\pi, \frac{1}{\text{MaxPhaseSize}} \times 2\pi, \ldots, \frac{\text{MaxPhaseSize} - 1}{\text{MaxPhaseSize}} \times 2\pi \tag{4}$$

where $\phi_k$ denotes the phase component of the $k^{th}$ path and MaxPhaseSize denotes a maximum phase size by which a phase can be rotated.

In FIG. 3, the paths may be the same as the multiple paths of a channel that a signal transmitted from a transmitter experiences until it is received at a receiver. Therefore, the receiver can receive the signal normally without any separate processing even though it has no knowledge of the gains and time delays of the paths used in the transmitter. Yet, one thing to note herein is that ISI does not occur only when the sum of the maximum time delay of the transmitter and the maximum time delay of the channel between the transmitter and the receiver is shorter than or equal to the length of the CP.

Meanwhile, a maximum delay spread estimator 350 is an optional device for estimating the delay spread of a received channel. The maximum delay spread estimator 350 may provide the maximum delay spread of the multiple paths of the channel to the gain delay controller 340 and the gain delay controller 340 may adaptively control the maximum time delay within the CP based on the received maximum delay spread.

Figure 5:
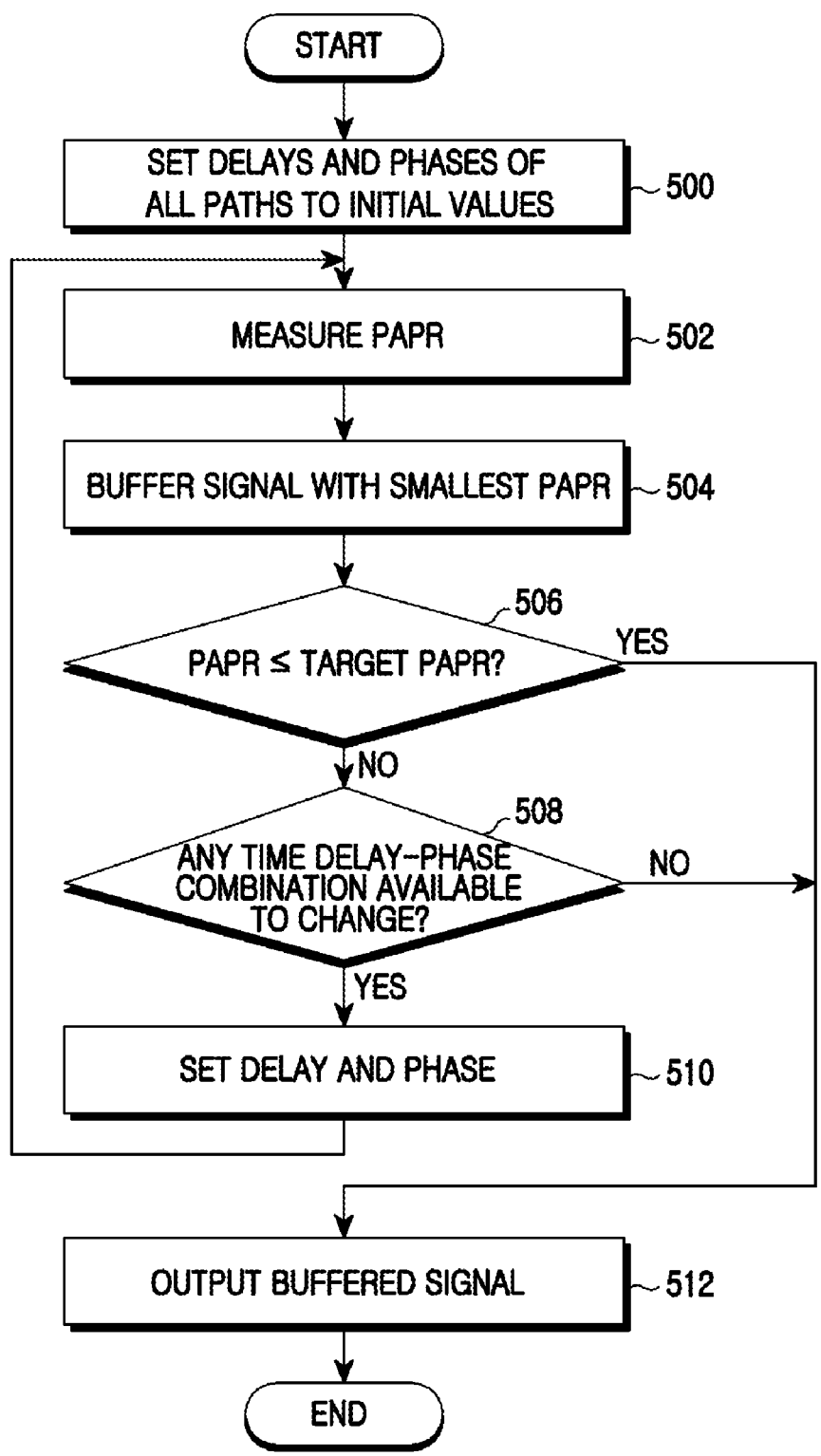
FIG. 5 is a flowchart illustrating a PAPR reduction operation of a PAPR reduction apparatus in a transmitter of an OFDM/OFDMA system according to an exemplary embodiment of the present invention.

FIG. 5 is a flowchart illustrating a PAPR reduction operation of a PAPR reduction apparatus in the transmitter of an OFDM/OFDMA system according to an exemplary embodiment of the present invention.

Referring to FIG. 5, upon receipt of a time signal with a CP, the PAPR reduction apparatus may set time delays and phases for all paths to initial values '0' in step 500 and may measure the PAPR of signals of the paths in combination in step 502. If the PAPR is less than a buffered smallest PAPR, the PAPR reduction apparatus may buffer the measured PAPR, i.e. the time signal with the smallest PAPR in step 504. In the mean time, a gain for each path may be preset to an empirically optimal value before the initialization of step 500.

In step 506, the PAPR reduction apparatus may compare the measured PAPR with a target PAPR. If the measured PAPR is larger than the target PAPR, the PAPR reduction apparatus may determine whether there is a time delay-phase combination that can be changed with respect to the paths except for the first path in step 508. In the presence of any time delay-phase combination available to change, the PAPR reduction apparatus may set the time delay and phase of a path to the time delay-phase combination that has not been used yet in step 510 and may return to step 502.

In step 510, given K paths, the PAPR reduction apparatus may first change the parameters of the $K^{th}$ path. When the parameters of the $K^{th}$ path cannot be changed any more, the parameters of the $(K-1)^{th}$ path may be changed. This process may be repeated until the parameters of the second path are all changed.

Steps 502 to 510 may be repeated until a measured PAPR is less than or equal to the target PAPR in step 506 or there is no time delay-phase combination subject to change in step 508.

If the measured PAPR is less than or equal to the target PAPR in step 506, the PAPR reduction apparatus may output the buffered time signal with the smallest PAPR in step 512. This buffered time signal may have a lower PAPR than the target PAPR.

In the absence of a time delay-phase combination that can be changed in step 508, the PAPR reduction apparatus may output the buffered time signal with the smallest PAPR in step 512. This buffered time signal may have a higher PAPR than the target PAPR but may be the smallest of signals that can be generated in all cases produced by the parameter changing.

As is apparent from the above description, the PAPR reduction apparatus and method for an OFDM system according to exemplary embodiments of the present invention address the need for transmitting additional information compared to the conventional linear PAPR reduction techniques and have low hardware complexity compared to other linear PAPR reduction apparatuses.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for reducing a Peak-to-Average Power Ratio (PAPR), the apparatus comprising:
    a gain processor for multiplying time signals in paths by gains set for respective paths;
    a delay processor for delaying gain-multiplied signals in second to last paths except for a first path by time delays set for respective second to last paths;
    a summer for summing the gain-multiplied signal for the first path received from the gain processor and the delayed signals received from the delay processor;
    a PAPR processor for measuring a PAPR of the summed signal received from the summer, for comparing the measured PAPR with a target PAPR, and for requesting one or more changes of at least one of the gain and the time delay of each path; and
    a gain delay controller for changing the at least one of the gain and the time delay of each path according to the request received from the PAPR processor and for controlling at least one of the gain processor and the delay processor according to the respective change,
    wherein, when the measured PAPR is larger than the target PAPR, the PAPR processor requests the one or more changes of the at least one of the gain and the time delay of each path, and the gain delay controller changes the at least one of the gain and the time delay of each path using a gain and delay combination that has not been previously used among all possible gain and delay combinations for each path.

2. The apparatus of claim 1, wherein the all possible gain and delay combinations comprise all combinations that can be produced by changing phase components of the gains and the time delays of the second to last paths.

3. The apparatus of claim 1, wherein each path is changed one at a time, and further wherein all possible changes are made to one path before making changes to another path.

4. The apparatus of claim 1, wherein the gain of each path is computed by $$g_k = |g_k| \exp(j\phi_k),$$

$$g_1^2 + g_2^2 + \ldots g_k^2 = 1$$

where $g_k$ denotes a gain of a $k^{th}$ path and $\phi_k$ denotes a phase component of the $k^{th}$ path.

5. The apparatus of claim 4, wherein the phase component of the $k^{th}$ path is computed by $$\phi_k = \frac{0}{\text{MaxPhaseSize}} \times 2\pi,$$

$$\frac{1}{\text{MaxPhaseSize}} \times 2\pi, \ldots, \frac{\text{MaxPhaseSize} - 1}{\text{MaxPhaseSize}} \times 2\pi$$

where $\phi_k$ denotes the phase component of the $k^{th}$ path and MaxPhaseSize denotes a maximum phase size by which a phase can be rotated.

6. The apparatus of claim 1, wherein the PAPR processor compares the measured PAPR with a buffered smallest PAPR, updates the buffered smallest PAPR with the smaller of the measured PAPR and the buffered smallest PAPR, and buffers a signal with the updated smallest PAPR.

7. The apparatus of claim 6, wherein if the measured PAPR is less than or equal to the target PAPR, the PAPR processor outputs the buffered signal.

8. The apparatus of claim 6, wherein when the PAPR processor has changed the at least one of the gain and the time delay of each path using all possible gain and delay combinations for each path, the PAPR processor outputs the buffered signal.

9. The apparatus of claim 1, wherein the gain delay controller changes a time delay by a defined delay unit.

10. A method for reducing a Peak-to-Average Power Ratio (PAPR), the method comprising:
multiplying time signals in paths by gains set for respective paths;
delaying gain-multiplied signals in second to last paths except for a first path by time delays set for respective second to last paths;
summing the gain-multiplied signal for the first path and the delayed signals;
measuring a PAPR of the summed signal;
comparing the measured PAPR with a target PAPR; and
changing at least one of the gain and the time delay of each path according to the comparison,
wherein, when the measured PAPR is larger than the target PAPR, the changing comprises changing the at least one of the gain and the time delay of each path using a gain and delay combination that has not been previously used among all possible gain and delay combinations for each path.

11. The method of claim 10, wherein the all possible gain and delay combinations comprise all combinations that can be produced by changing phase components of the gains and the time delays of the second to last paths.

12. The method of claim 10, wherein each path is changed one at a time, and further wherein all possible changes are made to one path before making changes to another path.

13. The method of claim 10, wherein the gain of each path is computed by $$g_k = |g_k|\exp(j\phi_k),$$

$$g_1^2 + g_2^2 + \ldots g_k^2 = 1$$

where $g_k$ denotes a gain of a $k^{th}$ path and $\phi_k$ denotes a phase component of the $k^{th}$ path.

14. The method of claim 13, wherein the phase component of the $k^{th}$ path is computed by $$\phi_k = \frac{0}{\text{MaxPhaseSize}} \times 2\pi, \frac{1}{\text{MaxPhaseSize}} \times 2\pi, \ldots, \frac{\text{MaxPhaseSize}-1}{\text{MaxPhaseSize}} \times 2\pi$$

where $\phi_k$ denotes the phase component of the $k^{th}$ path and MaxPhaseSize denotes a maximum phase size by which a phase can be rotated.

15. The method of claim 10, further comprising:
comparing the measured PAPR with a buffered smallest PAPR and updating the buffered smallest PAPR with the smaller of the measured PAPR and the buffered smallest PAPR; and
buffering a signal with the updated smallest PAPR.

16. The method of claim 15, further comprising, if the measured PAPR is less than or equal to the target PAPR, outputting the buffered signal.

17. The method of claim 15, further comprising, when the at least one of the gain and the time delay of each path has been changed using all possible gain and delay combinations for each path, outputting the buffered signal.

18. The method of claim 10, wherein the changing of the at least one of the gain and the time delay of each path comprises changing a time delay by a defined delay unit.

* * * * *